United States Patent
Kim et al.

(10) Patent No.: US 8,747,970 B2
(45) Date of Patent: Jun. 10, 2014

(54) ECO-FRIENDLY POLY(ALKYLENE CARBONATE) RESIN COMPOSITION FOR HIGH-TRANSPARENCY AND HIGH-GLOSS SHEET

(71) Applicants: Jae Koo Kim, Daejeon (KR); Young Hyo Park, Daejeon (KR); In Hun Son, Daejeon (KR); Seung Gweon Hong, Daejeon (KR); Kang Min Jung, Gyeonggi-do (KR); Kwang Jin Chung, Daejeon (KR); Myung Ahn Ok, Daejeon (KR)

(72) Inventors: Jae Koo Kim, Daejeon (KR); Young Hyo Park, Daejeon (KR); In Hun Son, Daejeon (KR); Seung Gweon Hong, Daejeon (KR); Kang Min Jung, Gyeonggi-do (KR); Kwang Jin Chung, Daejeon (KR); Myung Ahn Ok, Daejeon (KR)

(73) Assignees: SK Innovation Co., Ltd., Seoul (KR); SK Global Chemical Co., Ltd., Seoul (KR)

( * ) Notice: Subject to any disclaimer, the term of this patent is extended or adjusted under 35 U.S.C. 154(b) by 19 days.

(21) Appl. No.: 13/659,301

(22) Filed: Oct. 24, 2012

(65) Prior Publication Data
US 2013/0102715 A1    Apr. 25, 2013

(30) Foreign Application Priority Data

Oct. 24, 2011  (KR) .................. 10-2011-0108954
Oct. 24, 2012  (KR) .................. 10-2012-0118266

(51) Int. Cl.
*C08G 64/00*   (2006.01)
*B29D 22/00*   (2006.01)

(52) U.S. Cl.
USPC ....... 428/34.1; 428/34.2; 428/34.9; 428/35.7; 524/267

(58) Field of Classification Search
USPC .............. 428/34.1, 34.2, 34.9, 35.7; 524/267
See application file for complete search history.

(56) References Cited

U.S. PATENT DOCUMENTS

2005/0101757 A1   5/2005   Glasgow et al.

FOREIGN PATENT DOCUMENTS

| JP | 2006-265395 | 10/2006 |
|---|---|---|
| KR | 10-2009-0090154 | 8/2009 |
| KR | 10-2010-0013255 | 2/2010 |
| KR | 10-2010-0067593 | 6/2010 |

*Primary Examiner* — Terressa Boykin

(57) ABSTRACT

Provided is an eco-friendly poly(propylene carbonate) resin composition for a sheet, which is characterized by using a poly(alkylene carbonate) resin developed by efficiently utilizing carbon dioxide, which is a major contributor to global warding, as a main material, and including appropriate additives, such as, a strength modifier, and a flexibilizer, thereby completely solving environmental hazards controversy of the existing polyvinyl chloride resin products; exhibiting excellent mechanical and thermal properties, processability, post processability (printability, embossing and surface treatment, laminating characteristics) and superior anti-flaming property (low smoke density) and elongation characteristics as compared with the existing polyvinyl chloride resin products; and overcoming an extruding production method which is a small-sized production manner, corresponding to a big defect in thermoplastic plastics emerged as substitutes for polyvinyl chloride resin products and thus applying a calendering process method which is a mass production manner.

18 Claims, No Drawings

ECO-FRIENDLY POLY(ALKYLENE CARBONATE) RESIN COMPOSITION FOR HIGH-TRANSPARENCY AND HIGH-GLOSS SHEET

CROSS-REFERENCE TO RELATED APPLICATIONS

This application claims priority under 35 U.S.C. §119 to Korean Patent Application Nos. 10-2011-0108954, filed on Oct. 24, 2011 and 10-2012-0118266, filed Oct. 24, 2012 in the Korean Intellectual Property Office, the disclosure of which is incorporated herein by reference in its entirety.

TECHNICAL FIELD

The following disclosure relates to a resin composition for a high-transparency and high-gloss sheet, and more particularly to a resin composition for a high-transparency and high-gloss sheet, capable of substituting for a poly(vinyl chloride) material, which emits poisonous gas at the time of burning, while exhibiting excellent mechanical property even without using process additives harmful to the human body, and capable of being applicable to an extruding process as well as a calendering process to thereby skip a post treatment process and thus be economical, by using a poly(alkylene carbonate) resin that can effectively utilize carbon dioxide, a main course of global warming, as a main material.

BACKGROUND

Sheets including films account for about 30% of poly(vinyl chloride) (PVC) products. Among them, about 8% of the sheets are manufactured by coating a plastic sol where paste poly(vinyl chloride) resin is dispersed in additives such as a plasticizer, a stabilizer, and the like, on a substrate retaining a sheet form, such as, paper or fabric, followed by heating and then cooling, or are subjected to a calendering process.

These PVC sheets are mainly ornamental sheets, tarpaulin, a flooring material, wallpaper, packaging wrap, and the like. The ornamental sheet includes a decoration sheet and an interior sheet, which is a synthetic resin material used for decorating and finishing surfaces of products. The decoration sheet is used as a surface finishing material, such as interior building materials, furniture, electronic products, or the like, and refers to a synthetic resin material sheet having no adhesive layer. That is, it refers to a product where a print layer and a wear-resistant and scratch-resistant transparent film are laminated on a polyvinyl chloride or polypropylene material, and the classification and use thereof are as follows.

| Classification | Use |
|---|---|
| Over-Lay | interior and outerior building materials, doors, floorings, |
| Membrane | furniture for living room, shoe shelf, kitchen utensils |
| Wrapping | door frame, chassis |
| Edge | edges of furnitures and the like |
| Coating for steel | electronic goods, such as refrigerator, air conditioner, and the like |

The interior sheet is mainly used as an interior finishing material inside buildings, and refers to a synthetic resin material adhesive sheet where an adhesive agent is coated on one surface of a product. The main uses thereof are interior finishing materials for aircraft, railroad, marine or the like, including interior finishing materials for public buildings.

Tarpaulin is widely used for covers for various vehicles, leisure tents, industrial tents, roof covers for large-sized buildings, advertisement, and even for conveyer belts of various kinds of foods and products and for various rubber boats.

The flooring materials are classified into a residential flooring material for household and a commercial flooring material for public building and office. The wallpaper is classified for multi-use facility and for household. The packaging wrap is classified for household, for business purpose, and for food packaging.

Currently, most sheets are formed of mainly a polyvinyl chloride material, but replacement by olefin, polylactic acid, polyethylene terephthalate, or the like, is progressing due to various and wide regulations put on these products. With respect to environmental hazards controversy and regulatory trends put on polyvinyl chloride products, the cores of the controversy are that a large amount of dioxin, which is an environmental hormone, is generated when polyvinyl chloride itself is burned and a plasticizer, and that a stabilizer used as additives are in the center of worldwide regulations (WEEE/RoHS/REACH(SVCH)). Moreover, large amounts of poisonous gases, such as hydrochloric acid (HCl) and the like, and dioxins, which are fatal to the human body, are generated when polyvinyl chloride products are burned as wastes due to fire or difficulty in recycling. What is worse, it has been currently claimed that polyvinyl chloride itself is registered as EU ROHS restriction materials, and the more importantly, consumer groups are specifically demanding restrictions on the use of polyvinyl chloride products. For example, Greenpeace has spearheaded restrictions on the use of polyvinyl chloride resin in electronic products, and then electronic industries worldwide are copying Greenpeace. In particular, children and housewives, environmental pollution sensitive groups, tend to strongly refuse the polyvinyl chloride products and the trend thereof is increasing, and as a result, government regulations are being introduced.

Alternative materials employing eco-friendly universal plastic have been developed in order to solve problems of the polyvinyl chloride products. However, the alternative materials have problems in that physical properties are problematic, for example, they may be fragile in winter due to deficient flexibility thereof; process additives needs to be further used at the time of a post treatment process due to deterioration in printability, cutability, and adhesion, resulting in burden of expenses; and high costs are required due to producing by extrusion and high cost of the material itself, resulting in low economic feasibility.

RELATED ART DOCUMENTS

Patent Documents

US Patent Publication No. 2004-950100 (2005.05.12)
Japanese Patent Laid-Open Publication No. 2006-265395 (2005.03.24)

SUMMARY

An object of the present invention is to overcome deterioration in physical properties and post-processability such as printability, capability, and adhesion, of modified polyethylene, polypropylenes, polyethyleneterephthalate, polyurethane, thermoplastic polyolefin based resin, acrylic resin, and the like, which are eco-friendly universal plastics, emerged as alternative materials for polyvinyl chloride products at the center of the controversy of environmental hazards, by using a poly(alkylene carbonate) resin of the present invention as a main material and adding a minimum amount of process additive un-harmful to the human body and natural ecosystems thereto.

Another object of the present invention is to provide products manufactured by a poly(alkylene carbonate) resin composition according to the present invention, which have excellent anti-flaming property and excellent smoke density, to thereby prevent large amounts of fatal poisonous gases, which are unfavorable for interior materials, from being generated at the time of firing.

Still another object of the present invention is to overcome difficulty in a calendering process of a pellet type polymer material and thus remarkably lower production cost as compared with an extrusion process; allow a process at a low temperature as compared with polyvinyl chloride resin and thus improve workability; and lower specific gravity and viscosity and thus reduce manufacturing cost by manufacturers.

The present invention provides an eco-friendly poly(alkylene carbonate) resin composition for a high-transparency and high-gloss sheet, having combination of a strength modifier, a flexibilizer, and a lubricant, based on a poly(alkylene carbonate) resin.

In one general, a poly (alkylene carbonate) resin composition for a high-transparency and high-gloss sheet includes: based on 100 parts by weight of a poly(alkylene carbonate) resin, 0.1~100 parts by weight of a strength modifier, 0.1~50 parts by weight of a flexibilizer, and 0.1~5 parts of a lubricant.

Here, the resin composition may have smoke density (ASTM E662) of 10~50 m²/g.

The poly(alkylene carbonate) resin composition may satisfy Formulas 1 and 2 below:

$10 \leq T_{DS} \leq 50$ [Formula 1]

$60 \leq T_{HRR} \leq 65$ [Formula 2]

wherein in Formula 1, $T_{DS}$ represents a smoke density (ASTM E662, m²/g) value and in Formula 2, $T_{HRR}$ represents a heat emission (MJ/m²) value.

The poly(alkylene carbonate) resin has excellent tensile strength and tear strength, due to structural distinctiveness and excellent compatibility with process additives thereof, and in particular has elongation (elongation rate) and printability. In addition, anti-flaming property including smoke density (particularly, smoke density) is more excellent by 1/600 times as compared with that of universal plastics.

In the present invention, the poly(alkylene carbonate) resin may be shown in patent applications previously filed by the SK Innovation Company, (Korean Patent Laid-open Publication Nos. 2009-0090154, 2010-0067593, and 2010-0013255).

The poly (alkylene carbonate) is prepared by copolymerization of carbon dioxide and one or more epoxide compounds selected from the group consisting of (C2-C20)alkyleneoxide substituted or unsubstituted with halogen, (C1-C20)alkyloxy, (C6-C20)aryloxy, or (C6-C20)ar(C1-C20)alkyl (aralkyl)oxy; (C4-C20) cycloalkyleneoxide substituted or unsubstituted with halogen, (C1-C20)alkyloxy, (C6-C20)aryloxy or (C6-C20)ar(C1-C20)alky(aralkyl)oxy; and (C8-C20)styreneoxide substituted or unsubstituted with halogen, (C1-C20)alkyloxy, (C6-C20)aryloxy, (C6-C20)ar(C1-C20)alkyl(aralkyl)oxy, or (C1-C20)alkyl.

Here, the epoxide compounds may be one or more selected from the group consisting of ethylene oxide, propylene oxide, butene oxide, pentene oxide, hexene oxide, octene oxide, decene oxide, dodecene oxide, tetradecene oxide, hexadecene oxide, octadecene oxide, butadiene monoxide, 1,2-epoxide-7-octene, epifluorohydrin, epichlorohydrine, epibromohydrin, glycidyl methyl ether, glycidyl ethyl ether, glycidyl normal propyl ether, glycidyl sec-butyl ether, glycidyl normal or isopentyl ether, glycidyl normal hexyl ether, glycidyl normal heptyl ether, glycidyl normal octyl or 2-ethylhexyl ether, glycidyl normal or isononyl ether, glycidyl normal decyl ether, glycidyl normal dodecyl ether, glycidyl normal tetradecyl ether, glycidyl normal hexadecyl ether, glycidyl normal octadecyl ether, glycidyl normal icocyl ether, isopropyl glycidyl ether, butyl glycidyl ether, t-butyl glycidyl ether, 2-ethylhexyl glycidyl ether, allyl glycidyl ether, cyclopentene oxide, cyclohexene oxide, cyclooctene oxide, cyclododecene oxide, alpha-pinene oxide, 2,3-epoxide norbonene, limonene oxide, dieldrin, 2,3-epoxide propyl benzene, styrene oxide, phenyl propylene oxide, stilbene oxide, chlorostilbene oxide, dichlorostilbene oxide, 1,2-epoxy-3-phenoxypropane, benzyl oxymethyl oxirane, glycidyl-methylphenyl ether, chlorophenyl-2,3-epoxide propyl ether, epoxypropyl methoxyphenyl ether, biphenyl glycidyl ether, glycidyl naphthyl ether, glycidyl acetic acid ester, glycidyl propionate, glycidyl butanoate, glycidyl normal pentanoate, glycidyl normal hexanoate, glycidyl heptanoate, glycidyl normal octanoate, glycidyl 2-ethyl hexanoate, glycidyl normal nonanoate, glycidyl normal decanoate, glycidyl normal dodecanoate, glycidyl normal tetradecanoate, glycidyl normal hexadecanoate, glycidyl normal octadecanoate, and glycidyl icosanoate.

Also, the poly(alkylene carbonate) may be represented by Chemical Formula 1 below:

[Chemical Formula 1]

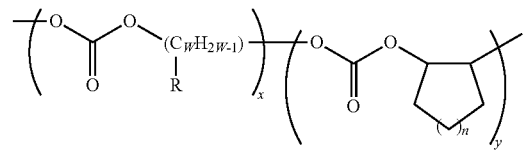

(wherein in Chemical Formula 1, w is an integer of 2 to 10; x is an integer of 5 to 100; y is an integer of 0 to 100; n is an integer of 1 to 3; and R is hydrogen, (C1-C4)alkyl, or —CH₂—O—R' (R' is (C1~C8) alkyl).

Here, in the poly(alkylene carbonate), examples of alkylene may include ethylene oxide, propylene, 1-butylene, cyclohezene oxide, alkylglycidyl ether, n-butyl, n-octyl, and the like, but are not limited thereto.

The poly (alkylene carbonate) is prepared by alternating copolymerization of carbon dioxide and at least one epoxide compound selected from the group consisting of (C2-C20) alkyleneoxide substituted or unsubstituted with halogen, (C1-C20)alkyloxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkyloxy, (C6-C20)aryloxy or (C6-C20)ar(C1-C20)alky(aralkyl)oxy; and (C8-C20)styreneoxide substituted or unsubstituted with halogen, (C1-C20)alkyloxy, (C6-C20)aryloxy, (C6-C20)ar (C1-C20)alkyl(aralkyl)oxy, or (C1-C20)alkyl, with the use of a complex compound of Chemical Formula 2 below as a catalyst, in the presence of a polymer compound having a hydroxyl or carboxyl group at a terminal or a side chain thereof.

[Chemical Formula 2]

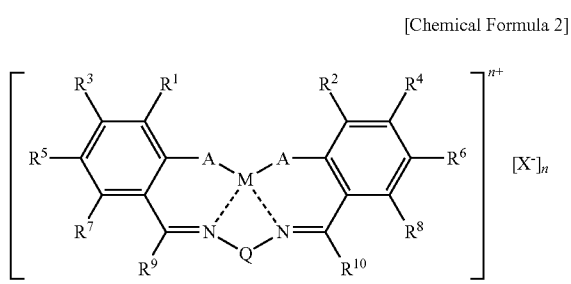

[In Chemical Formula 2,
M is trivalent cobalt or trivalent chromium;
A is an oxygen or sulfur atom;
Q is a diradical linking two nitrogen atoms
$R^1$ to $R^{10}$ each independently are hydrogen; halogen; (C1-C20)alkyl; (C1-C20)alkyl containing at least one of halogen, nitrogen, oxygen, silicon, sulfur and phosphor; (C2-C20)alkenyl; (C2-C20)alkenyl containing at least one of halogen, nitrogen, oxygen, silicon, sulfur and phosphor; (C1-C20)alkyl(C6-C20)aryl; (C1-C20)alkyl(C6-C20)aryl containing at least one of halogen, nitrogen, oxygen, silicon, sulfur and phosphor; (C6-C20)aryl(C1-C20)alkyl; (C6-C20)aryl(C1-C20)alkyl containing at least one of halogen, nitrogen, oxygen, silicon, sulfur and phosphor; (C1-C20)alkoxy; (C6-C30)aryloxy; formyl; (C1-C20) alkylcarbonyl; (C6-C20) arylcarbonyl; or a metalloid radical of Group 14 metal substituted with hydrocarbyl;

two of $R^1$ to $R^{10}$ may be linked to each other to form a ring;
at least one of hydrogens that are included in $R^1$ to $R^{10}$ and Q is substituted with a protonated terminal selected from the group consisting of Chemical Formulas a, b, and c below;

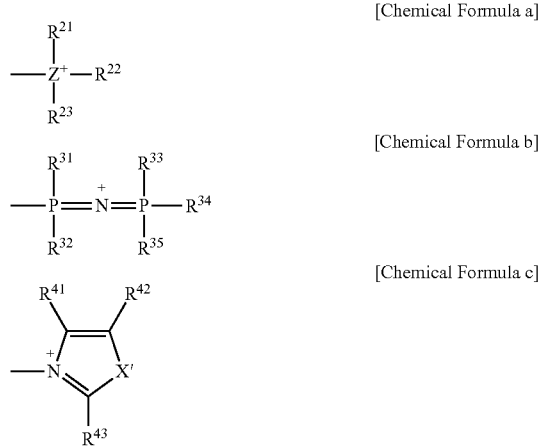

$X^-$ independently for each occurrence is a halide anion; $HCO_2^-$; $BF_4^-$; $ClO_4^-$; $NO_3^-$; $PF_6^-$; (C6-C20)aryloxy anion; (C6-C20)aryloxy anion containing one or more of halogen atom, nitrogen atom, oxygen atom, silicon atom, sulfur atom, and phosphor atom; (C1-C20)alkylcarboxyl anion; (C1-C20) alkyl carboxyl anion containing one or more of halogen atom, nitrogen atom, oxygen atom, silicon atom, sulfur atom, and phosphor atom; (C6-C20)arylcarboxyl anion; (C6-C20)arylcarboxyl anion containing one or more of halogen atom, nitrogen atom, oxygen atom, silicon atom, sulfur atom, and phosphor atom; (C1-C20)alkoxy anion; (C1-C20)alkoxy anion containing one or more of halogen atom, nitrogen atom, oxygen atom, silicon atom, sulfur atom, and phosphor atom; (C1-C20)alkylcarbonate anion; (C1-C20)alkylcarbonate anion containing one or more of halogen atom, nitrogen atom, oxygen atom, silicon atom, sulfur atom, and phosphor atom; (C6-C20)arylcarbonate anion; (C1-C20)arylcarbonate anion, containing one or more of halogen atom, nitrogen atom, oxygen atom, silicon atom, sulfur atom, and phosphor atom; (C1-C20)alkylsulfonate anion; (C1-C20)alkylsulfonate anion containing one or more of halogen atom, nitrogen atom, oxygen atom, silicon atom, sulfur atom, and phosphor atom; (C1-C20)alkylamido anion; (C1-C20) alkylamido anion containing one or more of halogen atom, nitrogen atom, oxygen atom, silicon atom, sulfur atom, and phosphor atom; (C6-C20)arylamido anion; (C6-C20)arylamido anion containing one or more of halogen atom, nitrogen atom, oxygen atom, silicon atom, sulfur atom, and phosphor atom; (C1-C20)alkylcarbamate anion; (C1-C20)alkylcarbamate anion containing one or more of halogen atom, nitrogen atom, oxygen atom, silicon atom, sulfur atom, and phosphor atom; or (C6-C20) arylcarbamate anion; (C6-C20)arylcarbamate anion containing one or more of halogen atom, nitrogen atom, oxygen atom, silicon atom, sulfur atom, and phosphor atom;

Z is a nitrogen or phosphor atom;
$R^{21}$, $R^{22}$, $R^{23}$, $R^{31}$, $R^{32}$, $R^{33}$, $R^{34}$ and $R^{35}$ each independently are (C1-C20)alkyl; (C1-C20) alkyl containing one or more of halogen, nitrogen, oxygen, silicon, sulfur and phosphor; (C2-C20)alkenyl; (C2-C20)alkenyl containing one or more of halogen, nitrogen, oxygen, silicon, sulfur and phosphor; (C1-C20)alkyl(C6-C20)aryl; (C1-C20)alkyl(C1-C20) aryl containing one or more of halogen, nitrogen, oxygen, silicon, sulfur and phosphor; (C6-C20)aryl(C1-C20)alkyl; (C6-C20)aryl(C1-C20)alkyl containing one or more of halogen, nitrogen, oxygen, silicon, sulfur and phosphor; or a metalloid radical of group 14 metal substituted with hydrocarbyl; and two of $R^{21}$, $R^{22}$ and $R^{23}$, or two of $R^{31}$, $R^{32}$, $R^{33}$, $R^{34}$ and $R^\pm$ may be liked to each other to form a ring;

$R^{41}$, $R^{42}$ and $R^{43}$ each independently are hydrogen, (C1-C20)alkyl; (C1-C20)alkyl containing one or more of halogen, nitrogen, oxygen, silicon, sulfur and phosphor; (C2-C20)alkenyl; (C2-C20)alkenyl containing one or more of halogen, nitrogen, oxygen, silicon, sulfur and phosphor; (C1-C20) alkyl(C6-C20)aryl; (C1-C20)alkyl(C6-C20)aryl containing one or more of halogen, nitrogen, oxygen, silicon, sulfur and phosphor; (C6-C20)aryl(C1-C20)alkyl; (C6-C20)aryl(C1-C20)alkyl containing one or more of halogen, nitrogen, oxygen, silicon, sulfur and phosphor; or a metalloid radical of group 14 metal substituted with hydrocarbyl; and two of $R^{41}$, $R^{42}$ and $R^{43}$ may be liked to each other to form a ring;

X' is an oxygen atom, a sulfur atom, or N—R (here, R is (C1-C20)alkyl);
n is an integer obtained by adding I to the total number of protonated terminals contained in $R^1$ to $R^{10}$ and Q;
$X^-$ may be coordinated to M; and
A nitrogen atom of imine may be coordinated to M or may be decoordinated from M].

In the present invention, the poly(alkylene carbonate) resin is preferably poly(propylene carbonate) obtained by copolymerization of polypropylene oxide and carbon dioxide.

The poly(alkylene carbonate) resin according to an embodiment of the present invention may have a weight average molecular weight of 50,000 to 1,000,000, and more preferably, 150,000 to 200,000. Here, preferably, the poly(alkylene carbonate) resin may have a glass transition temperature (Tg) of 32~35° C., and a melt index (MI, 150° C./5 kg) of 1 or smaller, and YI (color) of 30~40, but is not limited thereto. As such, the use of the poly(alkylene carbonate) resin having the above ranges can prevent generation of poisonous gas and improve anti-flaming property at the time of burning, and further significantly improve mechanical property as well as remarkably improve transparency and gloss of products even without a phthalate based plasticizer or a stabilizer, which is a process additive harmful to the human body.

The poly(alkylene carbonate) resin according to an embodiment of the present invention may have a specific weight of 1.1 to 1.2 g/cm$^3$. The above-described effects cannot be obtained out of the foregoing ranges.

The poly(alkylene carbonate) resin according to an embodiment of the present invention may have smoke density (measured according to the ASTM E662) of 10 to 20 m$^2$/g, preferably 2 to 10 m$^2$/g, and more preferably 1 to 2 m$^2$/g.

The universal resin generally has smoke density of 900 to 1300 m$^2$/g, and the addition of various additives may lead to improvement of smoke density thereof, up to 30m$^2$/g. However, the poly(alkylene carbonate) resin according to the present invention can minimize smoke density, and improve transparency, gloss, and stability of products by being combined with other components thereof even without poisonous additives.

The poly(alkylene carbonate) resin according to an embodiment of the present invention may have a heat emission rate of 60 to 65 MJ/cm$^2$. If out of the above range, self-extinguishment property may be diminished, resulting in deteriorating anti-flaming property. Here, the heat emission rate refers to an intensity of heat energy emitted per unit area and unit hour by burning of a sample.

The poly(alkylene carbonate) resin for a high-transparency and high-gloss sheet according to the present invention cam improve mechanical property such as tensile strength, elongation, and the like; improving post-processability such as printability, cutability, adhesion, and the like; and exhibiting excellent anti-flaming property and smoke density characteristics, by including a combination of a strength modifier, a flexibilizer, and a lubricant applicable to a poly(alkylene carbonate) resin. Contents thereof are determined due to combination thereof. When all the components are necessarily included, improvement in physical properties can be anticipated as a synergy effect.

In the poly(alkylene carbonate) resin composition according to an embodiment of the present invention, the strength modifier may be at least one selected from poly(methyl methacrylate) based resin, linear low-density polyethylene, low-density polyethylene, random polypropylene, random terpolypropylene, impact polypropylene, acrylonitrile rubber, polyester, ethylene propylene diene copolymer, polylactic acid, poly glycolic acid, polycaprolactone, poly (lactide-co-glycolide), polyethylene adipate, polyhydroxy alcanoate, and poly acrylic nitrile.

In the poly(alkylene carbonate) resin composition according to an embodiment of the present invention, the polymethylmethacrylate based resin may be polymethylmethacrylate alone or a mixture of 50~85% of polymethacrylate, 15~5% of polymethyl acrylate, and 35~5% of polybutylacrylate, and the glass transition temperature (Tg) thereof is preferably 85-165° C.

In the present invention, the foregoing strength modifier is used, in the poly(alkylene carbonate) resin, to thereby improve dimensional stability as well as mechanical property such as elongation, tensile strength, tear strength, and the like, and remarkably improve transparency and gloss, as compared with the existing polyvinyl chloride or polyolefin based resin.

In the poly(alkylene carbonate) resin composition according to an embodiment of the present invention, linear low-density polyethylene may have density of 0.91 g/cm$^2$ or smaller. The low-density polyethylene having density exceeding the above range of density may cause restriction in content thereof and deterioration in transparency and gloss. However, the content of the low-density polyethylene may be controlled depending on the combination of the flexibilizer, and in this case, low-density polyethylene having density of the above value range or greater, for example, 0.91~0.925 g/cm$^2$, may be used.

In the poly(alkylene carbonate) resin composition according to an embodiment of the present invention, random polypropylene obtained by copolymerization of propylene and ethylene, which has improved transparency and flexibility of homopropylene; random terpolypropylene obtained by copolymerization of three monomers of propylene, ethylene, and buten-1, which is a kind of random polypropylene; and impact polypropylene obtained by copolymerization of propylene and ethylene, which has improved low-temperature impact characteristics of homopolypropylene may be used as the strength modifier.

In the poly(alkylene carbonate) resin composition according to an embodiment of the present invention, polylactic acid (PLA, ring-opening polymerization of lactide) resin which is a thermoplastic polyester type homopolymer, poly glycolic acid (PGA, polycondensation of glycolic acid) resin, polycaprolactone (PCL, ring-opening polymerization of caprolactone) resin, poly(lactic-co-glycolic acid) (PLGA) resin which is a copolymer of polylactic acid resin and poly glycolic acid resin, polyethylene adipate (PEA) resin, or polyhydroxyalkanoate (PHA) resin may be used as the strength modifier.

In addition, in the poly(alkylene carbonate) resin composition for a high-transparency and high-gloss sheet according to an embodiment of the present invention, polyacrylonitrile may be used as the strength modifier. Preferably, the polyacrylonitrile may have an acrylonitrile content of 20 to 50%, Mooney viscosity (ML1+4, 100° C) of 40 to 100, and a specific weight of 0.06 to 1.00.

In addition, in the poly(alkylene carbonate) resin composition for a high-transparency and high-gloss sheet according to an embodiment of the present invention, polyester having a structure of Chemical Formula 3 below may be used as the strength modifier.

[Chemical Formula 3]

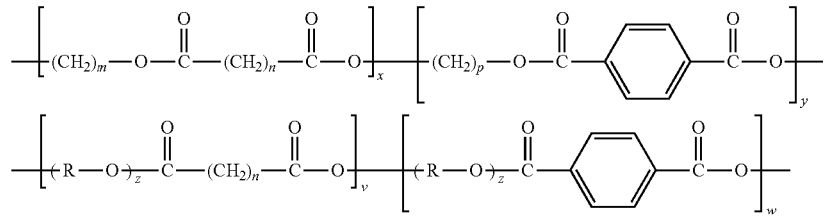

Wherein, —[R—O]$_z$— is polyol selected from the group consisting of (a) polyester polyol triol having a molecular weight of 200 to 10,000, (b) polyether glycol having a molecular weight of 200 to 10,000, and (c) polyester polyol diol having a molecular weight of 10,000 or less; m is an integer of 2 to 10; n is an integer of 0 to 18; p is an integer of 2 to 10, and v, w, x and y each are an integer of 0 to 100.

In addition, in the poly(alkylene carbonate) resin composition for a high-transparency and high-gloss sheet according to an embodiment of the present invention, an ethylenepropylenediene copolymer may be used as the strength modifier. The ethylenepropylenediene copolymer may have an ethylene content of 50 to 75% and Mooney viscosity (ML1+4, 125° C.) of 20 to 110.

In the poly(alkylene carbonate) resin composition according to an embodiment of the present invention, the flexibilizer may include at least one selected from an acrylate compound and a glutaric acid compound, and the content thereof may be 0.1 to 50 parts by weight based on 100 parts by weight of the resin. Here, the higher content of flexibilizer leads to improvement in transparency and gloss, but if the flexibilizer is used out of the above range, an effect of mitigating features of the resin being hardened and easily broken may not exhibited, and mechanical strength and dimensional stability may be significantly deteriorated. Even when the content of the flexibilizer is ⅓ times that of phthalate plasticizers used in a polyvinyl chloride resin, desired physical properties can be exhibited, resulting in excellent economic feasibility. Examples of the flexibilizer may be SKflex, DAIFATTY-101, and acrylate products.

In the poly(alkylene carbonate) resin composition according to an embodiment of the present invention, the lubricant may include at least one selected from stearic acid and dioctylterephthalate.

In addition, as the lubricant, organomodified or modified silicon oil may be used.

The organomodified or modified silicon oil may be alkyl modified, fluorine modified, polyether modified, amino modified, epoxy modified, phenol modified, carboxyl modified, methacrylate modified, or alkoxy modified silicon oil.

The poly(alkylene carbonate) resin composition for a high-transparency and high-gloss sheet according to the present invention may further include 0.1 to 5 parts by weight of at least one compatibilizer selected from the group consisting of a polyethylene based compound including polyethylene and maleic anhydride; an ethylene vinylacetate based compound including ethylene vinylacetate, polystyrene, and maleic anhydride; and a low low-density polyethylene based compound including low low-density polyethylene and maleic anhydride.

The present invention can provide an article manufactured by using the foregoing composition, and examples of this article may include paints, or surface protection sheets such as steel plate, wood, stone, plastic coatings; packaging wrap film; interior sheets; and flooring sheets, but are not limited thereto.

DETAILED DESCRIPTION OF EMBODIMENTS

Hereinafter, the present invention will be described in detail with reference to examples.

The following examples are for merely exemplifying the present invention, and therefore, the scope of the present invention is not limited to the following examples.

(Evaluation on Physical Properties)

1. Tensile strength/elongation: Measurement was conducted according to ASTM D638.

2. Tear strength was measured according to ASTM D1004.

3. Dimensional stability: A sheet sample (200×20 mm) was kept within a dry oven at 80° C. for one week, and then it was measured whether length variations thereof are within ±4%.

4. Cold-resistance: Five sheet samples (150×20 mm) were kept within a chamber at −30° C. for 4 hours, and then evaluation was conducted on the sheet samples by the Folding test (after each sample installed at the mouth thereof was folded and then unfolded, a degree at which the sample was split or broken was confirmed).

(Evaluation: Fail, when two or more samples are broken)

5. Transparency: measurement was conducted by using a Haze Meter.

6. Calendar processability and workability: blendability/kneadability, processing temperature, Roll workability, and the degree at which molten materials are stained on a roll, were measured.

(Evaluation: 1. very inferior, 2. inferior, 3. normal, 4. good, 5. very good)

7. Post processing workability: Workability in printing, embossing, laminating, or surface treatment was measured.

(Evaluation: 1. very interior, 2. inferior, 3. normal, 4. good, 5. very good)

8. Smoke density was measured according to ASTM E662.

EXAMPLE 1

Based on 100 parts by weight of a poly(propylene carbonate) resin (SK Innovation Company), 20 parts by weight of linear low-density polyethylene (FT400, SK Innovation Company), 5 parts by weight of a flexibilizer (DAIFATTY-101, DAIHACHI Company), 0.1 parts by weight of a polypropylene based compatibilizer (BP401, Honam Petrochemical Company), 1 part by weight of a lubricant (stearic acid, OCI Company) were inputted in a Henschel mixer, and then wet blended for 20 minutes. The wet blended mixture was inputted into a compounding extruder at 150° C. to be pelletized. This was manufactured into a semifinished sheet product through a kneading process (mixing rolls and warming rolls) and a calendering process, followed by print, primer, and surface treatment processes, and a laminating process, thereby manufacturing a sheet (including film). However, in the case where the flexibilizer was 20 parts by weight, a kneader type mixer was used, and the sheet (including film) was manufactured after the kneading and calendar processes were conducted in a sheet type.

COMPARATIVE EXAMPLE 1

A sheet was manufactured by the same method as Example 1 except that 100 parts by weight of a polyvinyl chloride resin (LS100S, LG Chemistry Company) instead of the poly(propylene carbonate) resin was used and the content of the linear low-density polyethylene was 0 part by weight. Then, physical properties thereof were measured.

EXAMPLES 1-1 to 1-7

Sheets were manufactured by controlling the contents of the linear low-density polyethylenes used in the components in Example 1 to be 0, 5, 10, 20, 50, 75, and 100 parts by weight, respectively. Then, physical property measurement results were tabulated in Table 1.

TABLE 1

|  | Example 1-1 | Example 1-2 | Example 1-3 | Example 1-4 | Example 1-5 | Example 1-6 | Example 1-7 | Comparative Example |
|---|---|---|---|---|---|---|---|---|
| Content of Strength Modifier | 0 | 5 | 10 | 20 | 50 | 75 | 100 | 0 |
| Tensile Strength (kgf/cm$^2$) | 50 | 135 | 160 | 185 | 215 | 250 | 285 | 100 |
| Tear Strength (kgf/cm$^2$) | 22 | 60 | 74 | 85 | 105 | 117 | 135 | 50 |
| Elongation (%) | 550 | 600 | 640 | 600 | 500 | 390 | 300 | 200 |
| Transparency (Haze, %) | <3 | <3 | <3 | <3 | <3 | 3-5 | <10 | <3 |
| Dimensional Stability (±4%, 80° C.) | x | ○ | ○ | ○ | ○ | ○ | ○ | ○ |
| Cold Resistance (−30° C.) | x | ○ | ○ | ○ | ○ | ○ | ○ | ○ |
| Calendering Processability&Workability | 2 | 3 | 4 | 4 | 4 | 5 | 5 | 3 |
| Post Processing Workability | 2 | 3 | 4 | 4 | 4 | 4 | 4 | 3 |
| Smoke Density | <10 | <30 | <30 | <30 | 40 | 50 | 60 | 600 |

When a strength modifier of the linear low-density polyethylene was used in the poly(propylene carbonate) resin according to the present invention, mechanical properties such as tensile and tear strengths and dimensional stability were very improved and more excellent elongation was exhibited as compared with a polyvinyl chloride resin or a polyolefin resin, When the content of the linear low-density polyethylene used was 100 parts by weight or less based on 100 parts by weight of the poly(propylene carbonate) resin, high transparency was exhibited. When the content thereof is above 100 parts by weight, opacity was increased and cold resistance was degraded. In addition, smoke density was excellent even when the content of the strength modifier used was 100parts by weight.

EXAMPLES 1-8 to 1-28

Sheets were manufactured by using SKflex from SK Innovation Company, DAIFATTY-101 from DAIHACHI Company, Japan, and acrylate from LG Chemistry Company, as the flexibilizer in the components in Example 1, and controlling contents thereof to be 0, 1, 2.5, 5, 10, 20, and 50 parts by weight, respectively. Then, physical property measurement results were tabulated in Tables 2 to 4.

TABLE 2

|  | Example 1-8 | Example 1-9 | Example 1-10 | Example 1-11 | Example 1-12 | Example 1-13 | Example 1-14 |
|---|---|---|---|---|---|---|---|
| Content of Skflex | 0 | 1 | 2.5 | 5 | 10 | 20 | 50 |
| Tensile Strength (kgf/cm$^2$) | 270 | 238 | 220 | 190 | 168 | 145 | 60 |
| Tear Strength (kgf/cm$^2$) | 130 | 113 | 107 | 86 | 75 | 64 | 24 |
| Elongation (%) | 370 | 450 | 510 | 580 | 630 | 710 | >800 |
| Transparency (Haze, %) | <3 | <3 | <3 | <3 | <3 | <2 | <2 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <30 | <30 | <30 | <30 | <30 | <30 | <30 |

TABLE 3

|  | Example 1-15 | Example 1-16 | Example 1-17 | Example 1-18 | Example 1-19 | Example 1-20 | Example 1-21 |
|---|---|---|---|---|---|---|---|
| Content of DAIFATTY-101 | 0 | 1 | 2.5 | 5 | 10 | 20 | 50 |
| Tensile Strength (kgf/cm$^2$) | 270 | 235 | 216 | 185 | 160 | 135 | 55 |
| Tear Strength (kgf/cm$^2$) | 130 | 112 | 105 | 85 | 72 | 60 | 22 |
| Elongation (%) | 370 | 460 | 510 | 600 | 660 | 740 | >800 |
| Transparency (Haze, %) | <3 | <3 | <3 | <3 | <3 | <2 | <2 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <30 | <30 | <30 | <30 | <30 | <30 | <30 |

TABLE 4

|  | Example 1-22 | Example 1-23 | Example 1-24 | Example 1-25 | Example 1-26 | Example 1-27 | Example 1-28 |
| --- | --- | --- | --- | --- | --- | --- | --- |
| Content of Acrylate | 0 | 1 | 2.5 | 5 | 10 | 20 | 50 |
| Tensile Strength (kgf/cm$^2$) | 270 | 231 | 210 | 178 | 157 | 129 | 50 |
| Tear Strength (kgf/cm$^2$) | 130 | 111 | 101 | 83 | 70 | 57 | 21 |
| Elongation (%) | 370 | 465 | 520 | 590 | 670 | 750 | >800 |
| Transparency (Haze, %) | <3 | <3 | <3 | <3 | <3 | <2 | <2 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <30 | <30 | <30 | <30 | <30 | <30 | <30 |

The flexibilizer used for mitigating features of the poly(propylene carbonate) resin being hardened and easily broken did not affect physical properties of the sheets until the content of the flexibilizer was 50 parts by weight. If the content thereof was above 50 parts by weight, mechanical strength and particularly dimensional stability may be deteriorated but transparency was improved. Even when the content of the flexibilizer used was ⅓ times that of phthalate plasticizers used in the polyvinyl chloride resin, desired physical properties can be exhibited, and smoke density was excellent regardless of the content of the flexibilizer.

EXAMPLES 1-29 to 1-33

Sheets were manufactured by controlling the contents of the compatibilizer used to be 0, 0.1, 0.5, 1, and 5 parts by weight based on the content of the strength modifier in the components in Example 1, respectively. Then, physical property measurement results were tabulated in Table 5.

TABLE 5

|  | Example 1-29 | Example 1-30 | Example 1-31 | Example 1-32 | Example 1-33 |
| --- | --- | --- | --- | --- | --- |
| Content of Compatibilizer | 0 | 0.1 | 0.5 | 1 | 5 |
| Tensile Strength (kgf/cm$^2$) | 150 | 185 | 200 | 218 | 230 |
| Tear Strength (kgf/cm$^2$) | 68 | 85 | 895 | 97 | 113 |
| Elongation (%) | 490 | 600 | 680 | 760 | >800 |

TABLE 5-continued

|  | Example 1-29 | Example 1-30 | Example 1-31 | Example 1-32 | Example 1-33 |
| --- | --- | --- | --- | --- | --- |
| Transparency (Haze, %) | — | <3 | <3 | <2 | <2 |
| Dimensional Stability (±4%, 80° C.) | x | ○ | ○ | ○ | ○ |
| Cold Resistance (° C.) | x | ○ | ○ | ○ | ○ |
| Calendering Processability&Workability | 3 | 4 | 4 | 4 | 4 |
| Post Processing Workability | 3 | 4 | 4 | 4 | 4 |
| Smoke Density | <30 | <30 | <30 | <30 | <30 |

The compatibilizer was used to maximize compatibility (improvement in meltability) with the poly(propylene carbonate) resin and the polyolefin based strength modifier to thereby improve the general physical properties. In particular, when the compatibilizer was not used, transparency was much deteriorated. The content of the compatibilizer is preferably 0.1 to 5 parts by weight in view of improvement in the entire physical properties. If the content of the compatibilizer was out of the above range, mechanical strength was less improved, and calendering processability and workability were deteriorated. Smoke density was very excellent regardless of the content of the compatibilizer.

EXAMPLES 1-34 to 1-39

Sheets were manufactured by controlling the contents of the lubricant used to be 0, 0.1, 0.5, 1, 2, and 5 parts by weight in the components in Example 1, respectively. Then, physical property measurement results were tabulated in Table 6.

TABLE 6

|  | Example 1-34 | Example 1-35 | Example 1-36 | Example 1-37 | Example 1-38 | Example 1-39 |
| --- | --- | --- | --- | --- | --- | --- |
| Content of Lubricant | 0 | 0.1 | 0.5 | 1 | 2 | 5 |
| Transparency (Haze, %) | <3 | <3 | <3 | <3 | <3 | >5 |
| Calendering Processability&Workability | 2 | 4 | 4 | 4 | 4 | 2 |
| Post Processing Workability | 2 | 4 | 4 | 4 | 4 | 2 |

The lubricant was used to improve calendering processability and workability, and when the lubricant was used in a content of 0.1 to 5 parts by weight, desired effects can be exhibited. If the content of the lubricant was out of the above range, meltability of the resin was much deteriorated and transparency was rapidly deteriorated, resulting in unavailable.

EXAMPLE 2

Based on 100 parts by weight of a poly(propylene carbonate) resin (SK Innovation Company), 20 parts by weight of random polypropylene (R380Y, SK Innovation Company), 5 parts by weight of a flexibilizer (DAIFATTY-101, DAIHACHI Company), 0.1 parts by weight of a polypropylene based compatibilizer (BP401, Honam Petrochemical Company), 1 part by weight of a lubricant (stearic acid, OCI Company) were inputted into a Henschel mixer, and then wet blended for 20 minutes. The wet blended mixture was inputted into a compounding extruder at 150° C. to be pelletized. This was manufactured into a semifinished sheet product through a kneading process (mixing rolls and warming rolls) and a calendering process, followed by print, primer, and surface treatment processes, and a laminating process, thereby producing a sheet (including film). However, in the case where the flexibilizer was 20 parts by weight, a kneader type mixer was used, and the sheet (including film) was produced after the kneading and calendar processes were conducted in a sheet type.

EXAMPLES 2-1 to 2-7

Sheets were manufactured by controlling the contents of the random polypropylene used in components in Example 2 to be 0, 5, 10, 20, 50, 75, and 100 parts by weight, respectively. Then, physical property measurement results were tabulated in Table 7.

TABLE 7

|  | Example 2-1 | Example 2-2 | Example 2-3 | Example 2-4 | Example 2-5 | Example 2-6 | Example 2-7 |
|---|---|---|---|---|---|---|---|
| Content of Strength Modifier | 0 | 5 | 10 | 20 | 50 | 75 | 100 |
| Tensile Strength (kgf/cm$^2$) | 50 | 150 | 185 | 215 | 235 | 270 | 300 |
| Tear Strength (kgf/cm$^2$) | 22 | 67 | 76 | 105 | 114 | 122 | 142 |
| Elongation (%) | 550 | 550 | 500 | 430 | 380 | 300 | 230 |
| Transparency (Haze, %) | <3 | <3 | <3 | <3 | <3 | <3 | 3-5 |
| Dimensional Stability (±4%, 80° C.) | x | ○ | ○ | ○ | ○ | ○ | ○ |
| Cold Resistance (−30° C.) | x | ○ | ○ | ○ | ○ | ○ | x |
| Calendering Processability&Workability | 2 | 3 | 4 | 4 | 4 | 5 | 5 |
| Post Processing Workability | 2 | 3 | 4 | 4 | 4 | 4 | 4 |
| Smoke Density | <10 | <30 | <30 | <30 | 40 | 50 | 60 |

EXAMPLES 2-8 to 2-28

Sheets were manufactured by using SKflex from SK Innovation Company, DAIFATTY-101 from DAIHACHI Company, Japan, and acrylate from LG Chemistry Company, as the flexibilizer in the components in Example 2, and controlling contents thereof to be 0, 1, 2.5, 5, 10, 20, and 50 parts by weight, respectively. Then, physical property measurement results were tabulated in Tables 8 to 10.

TABLE 8

|  | Example 2-8 | Example 2-9 | Example 2-10 | Example 2-11 | Example 2-12 | Example 2-13 | Example 2-14 |
|---|---|---|---|---|---|---|---|
| Content of Skflex | 0 | 1 | 2.5 | 5 | 10 | 20 | 50 |
| Tensile Strength (kgf/cm$^2$) | 310 | 276 | 242 | 219 | 190 | 168 | 77 |
| Tear Strength (kgf/cm$^2$) | 150 | 126 | 116 | 106 | 88 | 71 | 24 |
| Elongation (%) | 240 | 290 | 350 | 420 | 480 | 550 | 620 |
| Transparency (Haze, %) | <3 | <3 | <3 | <3 | <3 | <2 | <2 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <30 | <30 | <30 | <30 | <30 | <30 | <30 |

TABLE 9

| | Example 2-15 | Example 2-16 | Example 2-17 | Example 2-18 | Example 2-19 | Example 2-20 | Example 2-21 |
|---|---|---|---|---|---|---|---|
| Content of DAIFATTY-101 | 0 | 1 | 2.5 | 5 | 10 | 20 | 50 |
| Tensile Strength (kgf/cm$^2$) | 310 | 270 | 236 | 215 | 184 | 162 | 75 |
| Tear Strength (kgf/cm$^2$) | 150 | 125 | 114 | 105 | 88 | 69 | 25 |
| Elongation (%) | 240 | 300 | 370 | 430 | 500 | 580 | 650 |
| Transparency (Haze, %) | <3 | <3 | <3 | <3 | <3 | <2 | <2 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <30 | <30 | <30 | <30 | <30 | <30 | <30 |

TABLE 10

| | Example 2-22 | Example 2-23 | Example 2-24 | Example 2-25 | Example 2-26 | Example 2-27 | Example 2-28 |
|---|---|---|---|---|---|---|---|
| Content of Acrylate | 0 | 1 | 2.5 | 5 | 10 | 20 | 50 |
| Tensile Strength (kgf/cm$^2$) | 310 | 267 | 230 | 212 | 177 | 152 | 65 |
| Tear Strength (kgf/cm$^2$) | 150 | 124 | 111 | 104 | 86 | 66 | 22 |
| Elongation (%) | 240 | 320 | 390 | 440 | 490 | 590 | 670 |
| Transparency (Haze, %) | <3 | <3 | <3 | <3 | <3 | <2 | <2 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <30 | <35 | <35 | <35 | <35 | <35 | <35 |

EXAMPLES 2-29 to 2-33

Sheets were manufactured by controlling the contents of the compatibilizer used to be 0, 0.1, 0.5, 1, and 5 parts by weight based on the content of the strength modifier in components in Example 2, respectively. Then, physical property measurement results were tabulated in Table 11.

TABLE 11

| | Example 2-29 | Example 2-30 | Example 2-31 | Example 2-32 | Example 2-33 |
|---|---|---|---|---|---|
| Contetn of Compatibilizer | 0 | 0.1 | 0.5 | 1 | 5 |
| Tensile Strength (kgf/cm$^2$) | 188 | 215 | 234 | 256 | 288 |
| Tear Strength (kgf/cm$^2$) | 83 | 105 | 111 | 123 | 132 |
| Elongation (%) | 300 | 430 | 490 | 550 | 610 |
| Transparency (Haze, %) | — | <3 | <3 | <2 | <2 |
| Dimensional Stability (±4%, 80° C.) | ○ | ○ | ○ | ○ | ○ |
| Cold Resistance (° C.) | ○ | ○ | ○ | ○ | ○ |
| Calendering Processability&Workability | 4 | 4 | 4 | 4 | 4 |
| Post Processing Workability | 4 | 4 | 4 | 4 | 4 |
| Smoke Density | <30 | <30 | <30 | <30 | <30 |

EXAMPLES 2-34 to 2-39

Sheets were manufactured by controlling the contents of the lubricant used to be 0, 0.1, 0.5, 1, 2, and 5 parts by weight in the components in Example 2, respectively. Then, physical property measurement results were tabulated in Table 12.

TABLE 12

| | Example 2-34 | Example 2-35 | Example 1-36 | Example 1-37 | Example 1-38 | Example 1-39 |
|---|---|---|---|---|---|---|
| Contnet of Lubricant | 0 | 0.1 | 0.5 | 1 | 2 | 5 |
| Transparency (Haze, %) | <3 | <3 | <3 | <3 | <3 | >5 |
| Calendering Processability&Workability | 2 | 4 | 4 | 4 | 4 | 2 |
| Post Processing Workability | 2 | 4 | 4 | 4 | 4 | 2 |

EXAMPLE 3

Based on 100 parts by weight of a poly (propylene carbonate) resin (SK Innovation Company), 20 parts by weight of a ring-opening polymerization of lactide (PLA) resin (4060D, NatureWorks Company), 5 parts by weight of a flexibilizer (DAIFATTY-101, DAIHACHI Company), and 1 part by weight of a lubricant (dioctylterephthalate, LG Chemical Company) were inputted into a Henschel mixer, and then wet blended for 20 minutes. The wet blended mixture was inputted into a compounding extruder at 150° C. to be pelletized. This was manufactured into a semifinished sheet product through a kneading process (mixing rolls and warming rolls) and a calendering process, followed by print, primer, and surface treatment processes, and a laminating process, thereby producing a sheet (including film). However, in the case where the flexibilizer was 20 parts by content, a kneader type mixer was used, and the sheet (including film) was produced after the kneading and calendar processes were conducted, in a sheet type.

EXAMPLES 3-1 to 3-7

Sheets were manufactured by controlling the contents of the ring-opening polymerization of lactide (PLA) resin used in components in Example 3 to be 0, 5, 10, 20, 50, 75, and 100 parts by weight, respectively. Then, physical property measurement results were tabulated in Table 13.

TABLE 13

|  | Example 3-1 | Example 3-2 | Example 3-3 | Example 3-4 | Example 3-5 | Example 3-6 | Example 3-7 |
|---|---|---|---|---|---|---|---|
| Content of Strength Modifier | 0 | 5 | 10 | 20 | 50 | 75 | 100 |
| Tensile Strength (kgf/cm$^2$) | 50 | 145 | 173 | 195 | 226 | 265 | 295 |
| Tear Strength (kgf/cm$^2$) | 22 | 67 | 78 | 90 | 108 | 126 | 140 |
| Elongation (%) | 550 | 500 | 440 | 360 | 220 | 160 | 100 |
| Transparency (Haze, %) | <3 | <3 | <3 | <3 | <3 | <3 | 3-5 |
| Dimensional Stability (±4%, 80° C.) | x | ○ | ○ | ○ | ○ | ○ | ○ |
| Cold Resistance (−30° C.) | x | ○ | ○ | ○ | ○ | ○ | x |
| Calendering Processability&Workability | 2 | 3 | 4 | 4 | 4 | 4 | 2 |
| Post Processing Workability | 2 | 3 | 4 | 4 | 4 | 4 | 4 |
| Smoke Density | <10 | <10 | <10 | <10 | <10 | <10 | <10 |

EXAMPLES 3-8 to 3-28

Sheets were manufactured by using SKflex from SK Innovation Company, DAIFATTY-101 from DAIHACHI Company, Japan, and acrylate from LG Chemistry Company, as the flexibilizer in the components in Example 3, and controlling contents thereof to be 0, 1, 2.5, 5, 10, 20, and 50 parts by weight, respectively. Then, physical property measurement results were tabulated in Tables 14 to 16.

TABLE 14

|  | Example 3-8 | Example 3-9 | Example 3-10 | Example 3-11 | Example 3-12 | Example 3-13 | Example 3-14 |
|---|---|---|---|---|---|---|---|
| Content of Skflex | 0 | 1 | 2.5 | 5 | 10 | 20 | 50 |
| Tensile Strength (kgf/cm$^2$) | 280 | 260 | 228 | 203 | 174 | 136 | 55 |
| Tear Strength (kgf/cm$^2$) | 132 | 115 | 99 | 91 | 72 | 58 | 20 |
| Elongation (%) | 180 | 230 | 280 | 330 | 400 | 470 | 520 |
| Transparency (Haze, %) | <3 | <3 | <3 | <3 | <3 | <3 | <3 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <10 | <10 | <10 | <10 | <10 | <10 | <10 |

TABLE 15

|  | Example 3-15 | Example 3-16 | Example 3-17 | Example 3-18 | Example 3-19 | Example 3-20 | Example 3-21 |
|---|---|---|---|---|---|---|---|
| Content of DAIFATTY-101 | 0 | 1 | 2.5 | 5 | 10 | 20 | 50 |
| Tensile Strength (kgf/cm$^2$) | 280 | 254 | 220 | 195 | 164 | 128 | 50 |
| Tear Strength (kgf/cm$^2$) | 132 | 113 | 97 | 90 | 71 | 57 | 19 |
| Elongation (%) | 180 | 240 | 300 | 360 | 450 | 510 | 580 |

TABLE 15-continued

|  | Example 3-15 | Example 3-16 | Example 3-17 | Example 3-18 | Example 3-19 | Example 3-20 | Example 3-21 |
|---|---|---|---|---|---|---|---|
| Transparency (Haze, %) | <3 | <3 | <3 | <3 | <3 | <3 | <3 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <10 | <10 | <10 | <10 | <10 | <10 | <10 |

TABLE 16

|  | Example 3-22 | Example 3-23 | Example 3-24 | Example 3-25 | Example 3-26 | Example 3-27 | Example 3-28 |
|---|---|---|---|---|---|---|---|
| Contetn of Acrylate | 0 | 1 | 2.5 | 5 | 10 | 20 | 50 |
| Tensile Strength (kgf/cm$^2$) | 280 | 250 | 213 | 188 | 155 | 120 | 48 |
| Tear Strength (kgf/cm$^2$) | 132 | 111 | 94 | 85 | 68 | 55 | 19 |
| Elongation (%) | 180 | 250 | 290 | 380 | 470 | 550 | 640 |
| Transparency (Haze, %) | <3 | <3 | <3 | <3 | <3 | <3 | <3 |
| Dimensional Stability (±4%, 80° C.) | ○ | ○ | ○ | ○ | ○ | ○ | ○ |
| Cold Resistance (° C.) | x | ○ | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <10 | <10 | <10 | <10 | <10 | <10 | <10 |

EXAMPLES 3-29 to 3-34

Sheets were manufactured by controlling the contents of the lubricant used to be 0, 0.1, 0.5, 1, 2, and 5 parts by weight in the components in Example 3, respectively. Then, physical property measurement results were tabulated in Table 17.

TABLE 17

|  | Example 3-29 | Example 3-30 | Example 3-31 | Example 3-32 | Example 3-33 | Example 3-34 |
|---|---|---|---|---|---|---|
| Content of Lubricant | 0 | 0.1 | 0.5 | 1 | 2 | 5 |
| Transparency (Haze, %) | <3 | <3 | <3 | <3 | <3 | <3 |
| Calendering Processability&Workability | 2 | 4 | 4 | 4 | 4 | 2 |
| Post Processing Workability | 2 | 4 | 4 | 4 | 4 | 2 |

EXAMPLE 4

Based on 100 parts by weight of a poly(propylene carbonate) resin (SK Innovation Company), 20 parts by weight of a polymethylmethacrylate resin (HP210, LG MMA Company), 5 parts by weight of a flexibilizer (DAIFATTY -101, DAIHACHI Company), and 1 part by weight of a lubricant (dioctylterephthalate, LG Chemical Company) were inputted into a Henschel mixer, and then wet blended for 20 minutes. The wet blended mixture was inputted into a compounding extruder at 140° C. to be palletized. This was manufactured into a semifinished sheet product through a kneading process (mixing rolls and warming rolls) and a calendering process, followed by print, primer, and surface treatment processes, and a laminating process, thereby producing a sheet (including film). However, in the case where the flexibilizer was 20 parts by content, a kneader type mixer was used, and the sheet (including film) was produced after the kneading and calendar processes were conducted in a sheet type.

EXAMPLES 4-1 to 4-7

Sheets were manufactured by controlling the contents of the polymethylmethacrylate resin used in components in Example 4 to be 0, 5, 10, 20, 50, 75, and 100 parts by weight, respectively. Then, physical property measurement results were tabulated in Table 18.

TABLE 18

|  | Example 4-1 | Example 4-2 | Example 4-3 | Example 4-4 | Example 4-5 | Example 4-6 | Example 4-7 |
|---|---|---|---|---|---|---|---|
| Content of Strength Modifier | 0 | 5 | 10 | 20 | 50 | 75 | 100 |

TABLE 18-continued

|  | Example 4-1 | Example 4-2 | Example 4-3 | Example 4-4 | Example 4-5 | Example 4-6 | Example 4-7 |
|---|---|---|---|---|---|---|---|
| Tensile Strength (kgf/cm$^2$) | 50 | 180 | 225 | 260 | 335 | 380 | 450 |
| Tear Strength (kgf/cm$^2$) | 22 | 87 | 106 | 125 | 154 | 168 | 212 |
| Elongation (%) | 550 | 420 | 310 | 230 | 100 | 80 | <50 |
| Transparency (Haze, %) | <3 | <1 | <1 | <1 | <1 | <1 | <1 |
| Dimensional Stability (±4%, 80° C.) | x | ○ | ○ | ○ | ○ | ○ | ○ |
| Cold Resistance (−30° C.) | x | ○ | ○ | ○ | ○ | ○ | x |
| Calendering Processability&Workability | 2 | 3 | 4 | 4 | 4 | 5 | 5 |
| Post Processing Workability | 2 | 3 | 4 | 4 | 4 | 4 | 4 |
| Smoke Density | <10 | <20 | <20 | <20 | <20 | <20 | <20 |

EXAMPLES 4-8 to 4-28

Sheets were manufactured by using SKflex from SK Innovation Company, DAIFATTY-101 from DAIHACHI Company, Japan, and acrylate from LG Chemistry Company, as the flexibilizer in the components in Example 4, and controlling contents thereof to be 0, 1, 2.5, 5, 10, 20, and 50 parts by weight, respectively. Then, physical property measurement results were tabulated in Tables 19 to 21.

TABLE 19

|  | Example 4-8 | Example 4-9 | Example 4-10 | Example 4-11 | Example 4-12 | Example 4-13 | Example 4-14 |
|---|---|---|---|---|---|---|---|
| Content of Skflex | 0 | 1 | 2.5 | 5 | 10 | 20 | 50 |
| Tensile Strength (kgf/cm$^2$) | 330 | 318 | 294 | 270 | 244 | 215 | 158 |
| Tear Strength (kgf/cm$^2$) | 159 | 146 | 135 | 128 | 115 | 101 | 72 |
| Elongation (%) | 200 | 120 | 170 | 220 | 290 | 350 | 410 |
| Transparency (Haze, %) | <1 | <1 | <1 | <1 | <1 | <1 | <1 |
| Dimensional Stability (±4%, 80° C.) | ○ | ○ | ○ | ○ | ○ | ○ | ○ |
| Cold Resistance (° C.) | x | x | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <20 | <20 | <20 | <20 | <20 | <20 | <20 |

TABLE 20

|  | Example 4-15 | Example 4-16 | Example 4-17 | Example 4-18 | Example 4-19 | Example 4-20 | Example 4-21 |
|---|---|---|---|---|---|---|---|
| Content of DAIFATTY-101 | 0 | 1 | 2.5 | 5 | 10 | 20 | 50 |
| Tensile Strength (kgf/cm$^2$) | 350 | 315 | 288 | 260 | 238 | 205 | 155 |
| Tear Strength (kgf/cm$^2$) | 162 | 148 | 133 | 125 | 114 | 99 | 71 |
| Elongation (%) | <40 | 110 | 180 | 230 | 310 | 380 | 450 |
| Transparency (Haze, %) | <1 | <1 | <1 | <1 | <1 | <1 | <1 |
| Dimensional Stability (±4%, 80° C.) | ○ | ○ | ○ | ○ | ○ | ○ | ○ |
| Cold Resistance (° C.) | x | x | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <20 | <20 | <20 | <20 | <20 | <20 | <20 |

TABLE 21

|  | Example 4-22 | Example 4-23 | Example 4-24 | Example 4-25 | Example 4-26 | Example 4-27 | Example 4-28 |
|---|---|---|---|---|---|---|---|
| Content of Acrylate | 0 | 1 | 2.5 | 5 | 10 | 20 | 50 |
| Tensile Strength (kgf/cm$^2$) | 330 | 308 | 275 | 252 | 230 | 195 | 142 |
| Tear Strength (kgf/cm$^2$) | 159 | 144 | 130 | 122 | 111 | 95 | 66 |
| Elongation (%) | 200 | 120 | 180 | 250 | 330 | 400 | 490 |
| Transparency (Haze, %) | <1 | <1 | <1 | <1 | <1 | <1 | <1 |
| Dimensional Stability | ○ | ○ | ○ | ○ | ○ | ○ | ○ |

TABLE 21-continued

|  | Example 4-22 | Example 4-23 | Example 4-24 | Example 4-25 | Example 4-26 | Example 4-27 | Example 4-28 |
|---|---|---|---|---|---|---|---|
| (±4%, 80° C.) |  |  |  |  |  |  |  |
| Cold Resistance (° C.) | x | x | ○ | ○ | ○ | ○ | ○ |
| Calendering Processability&Workability | 4 | 4 | 4 | 4 | 4 | 4 | 3 |
| Post Processing Workability | 4 | 4 | 4 | 4 | 4 | 4 | 4 |
| Smoke Density | <20 | <20 | <20 | <20 | <20 | <20 | <20 |

EXAMPLES 4-29 to 4-34

Sheets were manufactured by controlling the contents of the lubricant used to be 0, 0.1, 0.5, 1, 2, and 5 parts by weight in the components in Example 4, respectively. Then, physical property measurement results were tabulated in Table 22.

TABLE 22

|  | Example 4-29 | Example 4-30 | Example 4-31 | Example 4-32 | Example 4-33 | Example 4-34 |
|---|---|---|---|---|---|---|
| Content of Lubricant | 0 | 0.1 | 0.5 | 1 | 2 | 5 |
| Transparency (Haze, %) | <1 | <1 | <1 | <1 | <1 | <1 |
| Calendering Processability&Workability | 2 | 4 | 4 | 4 | 4 | 2 |
| Post Processing Workability | 2 | 4 | 4 | 4 | 4 | 2 |

As set forth above, the products manufactured from the eco-friendly poly(alkylene carbonate) resin composition for a high-transparency and high-gloss sheet according to the present invention never generates poisonous gases and dioxin at the time of combustion, which is a big defect in polyvinyl chloride materials. In particular, smoke density of the resin composition is approximately 1/600 times that of the polyvinyl chloride resin, and thus no harmful gases are generated during processing or the use of products, thereby exhibiting excellent flameproofing property. Further, the present invention can utilize carbon dioxide, which is a major contributor to global warming; remarkably improve physical properties, such as flexibility, strength, elongation, and the like, above the level of the existing polyvinyl chloride resin, even without using phthalate based plasticizers and stabilizers, which are processing additives harmful to the human body; and significantly improve transparency and gloss of the products.

Further, the resin composition according to the present invention can be applied in a calendar processing method allowing mass production, discarding an extrusion processing method which is regarded as the biggest defect of alternatives for the existing polyvinyl chloride, so that breakage can not occur during the winter, or post processing treatment, such as printing, surface treatment, and the like, can not be required, resulting in excellent economic feasibility.

What is claimed is:

1. A poly(alkylene carbonate) resin composition for a high-transparency and high-gloss sheet, comprising: based on 100 parts by weight of a poly(alkylene carbonate) resin, 0.1~100 parts by weight of a strength modifier, 0.1~50 parts by weight of a flexibilizer, and 0.1~5 parts of a lubricant, wherein it has smoke density (ASTM E662) of 10~50 m²/g.

2. The poly(alkylene carbonate) resin composition of claim 1, wherein it satisfies Formulas 1 and 2 below:

$$10 \leq T_{DS} \leq 50 \quad [\text{Formula 1}]$$

$$60 \leq T_{HRR} \leq 65 \quad [\text{Formula 2}]$$

(wherein in Formula 1, $T_{DS}$ represents a smoke density (ASTM E662, m²/g) value and in Formula 2, $T_{HRR}$ represents a heat emission (MJ/m²) value).

3. The poly(alkylene carbonate) resin composition of claim 1, wherein the poly(alkylene carbonate) resin is prepared by copolymerization of carbon dioxide and at least one epoxide compound selected from the group consisting of (C2-C20) alkyleneoxide substituted or unsubstituted with halogen, (C1-C20)alkyloxy, (C6-C20)aryloxy, or (C6-C20)ar(C1-C20)alkyl(aralkyl)oxy; (C4-C20)cycloalkyleneoxide substituted or unsubstituted with halogen, (C1-C20)alkyloxy, (C6-C20)aryloxy or (C6-C20)ar(C1-C20)alky(aralkyl)oxy; and (C8-C20)styreneoxide substituted or unsubstituted with halogen, (C1-C20)alkyloxy, (C6-C20)aryloxy, (C6-C20)ar(C1-C20)alkyl(aralkyl)oxy, or (C1-C20)alkyl.

4. The poly(alkylene carbonate) resin composition of claim 1, wherein the poly(alkylene carbonate) resin is represented by Chemical Formula 1 below:

[Chemical Formula 1]

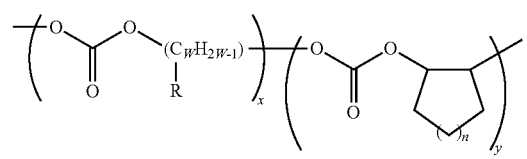

(wherein in the Chemical Formula 1, w is an integer of 2 to 10, x is an integer of 5 to 100, y is an integer of 0 to 100, n is an integer of 1 to 3, and R is hydrogen, (C1-C4) alkyl, or —CH₂—O—R' (R' is (C1-C8) alkyl).

5. The poly(alkylene carbonate) resin composition of claim 1, wherein the poly(alkylene carbonate) resin has a weight average molecular weight of 50,000 to 1,000,000.

6. The poly(alkylene carbonate) resin composition of claim 1, wherein the poly(alkylene carbonate) resin has a specific weight of 1.1 to 1.2 g/cm³.

7. The poly(alkylene carbonate) resin composition of claim 1, wherein the poly(alkylene carbonate) resin is obtained by copolymerization of polypropylene oxide and carbon dioxide.

8. The poly(alkylene carbonate) resin composition of claim 1, wherein the strength modifier is at least one selected from poly(methyl methacrylate) based resin, linear low-density polyethylene, low-density polyethylene, random polypropylene, random ter-polypropylene, impact polypropylene, acrylonitrile rubber, polyester, ethylene propylene diene copolymer, polylactic acid, poly glycolic acid, polycaprolactone, poly(lactide-co-glycolide), polyethylene adipate, polyhydroxy alcanoate, and poly acrylic nitrite.

9. The poly(alkylene carbonate) resin composition of claim 8, wherein the polymethylmethacrylate based resin is polymethylmethacrylate alone or a mixture of 50~85% of polymethacrylate, 15~5% of polymethyl acrylate, and 35~5% of polybutyl acrylate, and has a glass transition temperature (Tg) of 85~165° C.

10. The poly(alkylene carbonate) resin composition of claim 8, wherein the polyacrylonitrile has an acrylonitrile content of 20~50%, Mooney density (ML1+4, 100° C.) of 40~100, and a specific weight of 0.96~1.00.

11. The poly(alkylene carbonate) resin composition of claim 8, wherein the polyester has a structure of Chemical Formula 3 below:

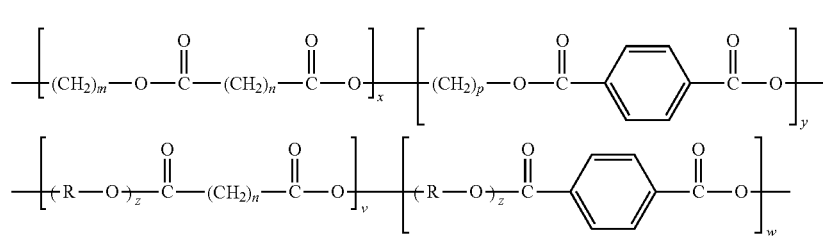

[Chemical Formula 3]

(wherein in Chemical Formula 3, m is an integer of 2 to 10; n is an integer of 0 to 18; p is an integer of 2 to 10; and v, w, x, and y each are an integer of 0 to 100).

12. The poly(alkylene carbonate) resin composition of claim 8, wherein the ethylenepropylenediene copolymer has an ethylene content of 50 to 75 wt. % and Mooney viscosity (ML1+4, 125° C.) of 20 to 110.

13. The poly(alkylene carbonate) resin composition of claim 8, wherein the linear low-density polyethylene has density of 0.91 g/cm$^2$ or lower.

14. The poly(alkylene carbonate) resin composition of claim 8, wherein the low-density polyethylene has density of 0.91~0.925 g/cm$^2$.

15. The poly(alkylene carbonate) resin composition of claim 1, wherein the flexibilizer is at least one selected from acrylate based compounds and glutaric acid compounds.

16. The poly(alkylene carbonate) resin composition of claim 1, wherein, the lubricant is at least one selected from stearic acid, dioctylterephthalate, and silicon oil.

17. The poly(alkylene carbonate) resin composition of claim 1, further comprising: 0.1 to 5 parts by weight of at least one compatibilizer selected from the group consisting of a polyethylene based compound including polyethylene and maleic anhydride; an ethylene vinylacetate based compound including ethylene vinylacetate, polystyrene, and maleic anhydride; and a low low-density polyethylene based compound including low low-density polyethylene and maleic anhydride.

18. An article manufactured by using the composition of claims 1.

* * * * *